July 28, 1953  T. M. COLE ET AL  2,647,225
TERMINAL PANEL ASSEMBLY
Filed Nov. 15, 1949  3 Sheets-Sheet 1

INVENTORS
THOMAS M. COLE AND
PAUL M. CHRISTENSEN
BY Edwin Levisohn
Harry Cohn
Attorneys July 28, 1953 T. M. COLE ET AL 2,647,225
TERMINAL PANEL ASSEMBLY
Filed Nov. 15, 1949 3 Sheets-Sheet 2
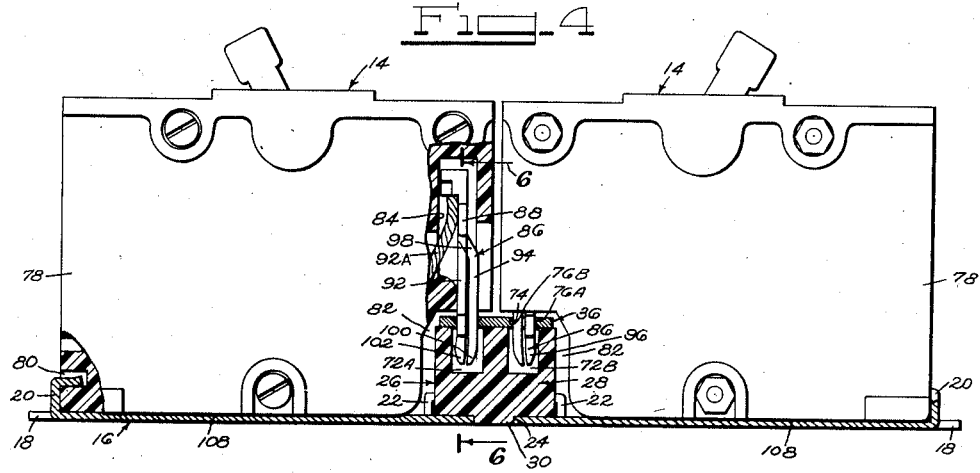
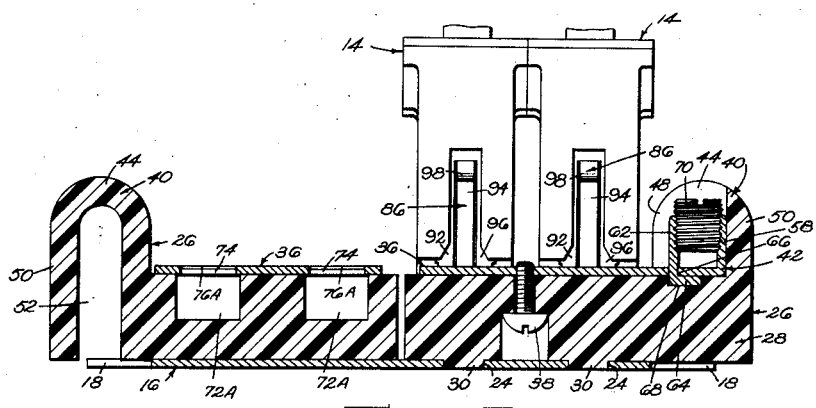
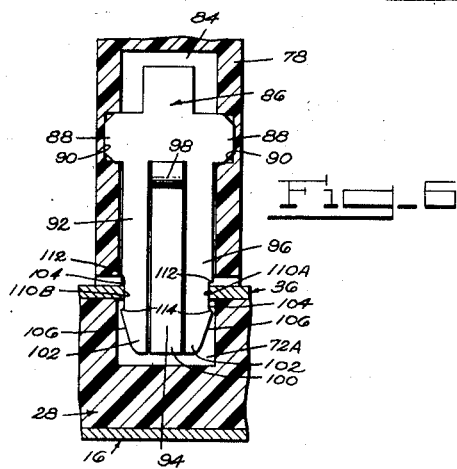
INVENTORS
THOMAS M. COLE AND
PAUL M. CHRISTENSEN
BY
ATTORNEYS July 28, 1953

T. M. COLE ET AL 2,647,225

TERMINAL PANEL ASSEMBLY

Filed Nov. 15, 1949

INVENTORS
THOMAS M. COLE AND
PAUL M. CHRISTENSEN
BY Edwin Levisohn +
Harry Cole
ATTORNEYS

Patented July 28, 1953

2,647,225

UNITED STATES PATENT OFFICE 2,647,225

TERMINAL PANEL ASSEMBLY

Thomas M. Cole, New York, N. Y., and Paul M. Christensen, West Orange, N. J., assignors to Federal Electric Products Company, Newark, N. J., a corporation Application November 15, 1949, Serial No. 127,432

26 Claims. (Cl. 317—112)

This invention relates in general to a terminal panel assembly for electrical apparatus and, more particularly, to a terminal panel to which electrical devices, such as circuit breakers, may be removably connected mechanically and electrically by a "plug-in" type of connection.

It is an object of the invention to provide a terminal panel assembly on which electrical devices may be readily bodily mounted to effect electrical contact, and from which said devices may be readily removed, said devices, nevertheless, when so mounted, being firmly engaged in said panel assembly and being retained against accidental dislodgment.

A further object is the provision of a terminal panel assembly having a plurality of terminal connecting blocks which are readily mountable thereon, said blocks being readily removable therefrom for inspection, repair or replacement.

Another object is the provision of an improved panel contact and companion prong contact combination between a panel and a circuit breaker or other electrical device adapted to be mounted on the panel in readily attachable and detachable relation thereto.

Another object is the provision of a terminal panel assembly of generally simplified construction and arrangement.

The above and other objects, features and advantages of the present invention will be fully understood from the following description considered in connection with the accompanying illustrative drawings.

In the drawings:

Fig. 4 is a sectional view taken on line 4—4 of Fig. 1, the circuit breakers being shown substantially in elevation;

Fig. 5 is a sectional view taken on line 5—5 of Fig. 1;

Fig. 6 is a sectional view taken on line 6—6 of Fig. 4, the terminal member of the circuit breaker being shown in elevation;

Figure 1:
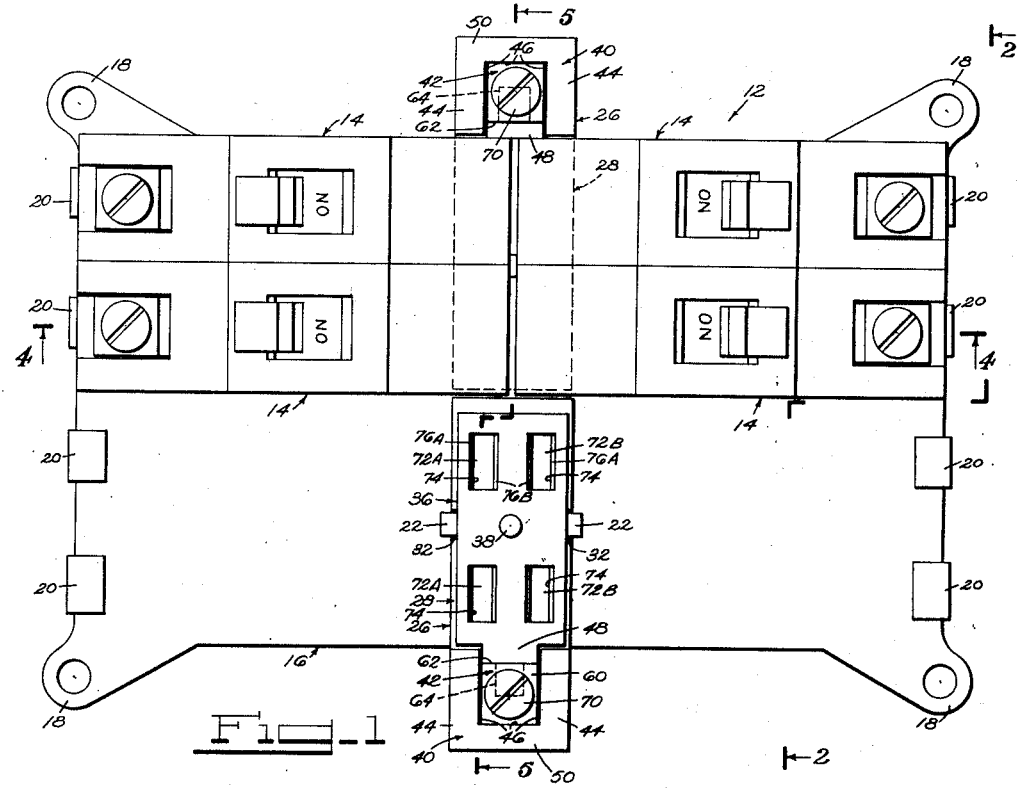
Fig. 1 is a top plan view of a terminal panel assembly according to the present invention, said assembly having circuit breakers in operative connection thereon.
Figure 2:
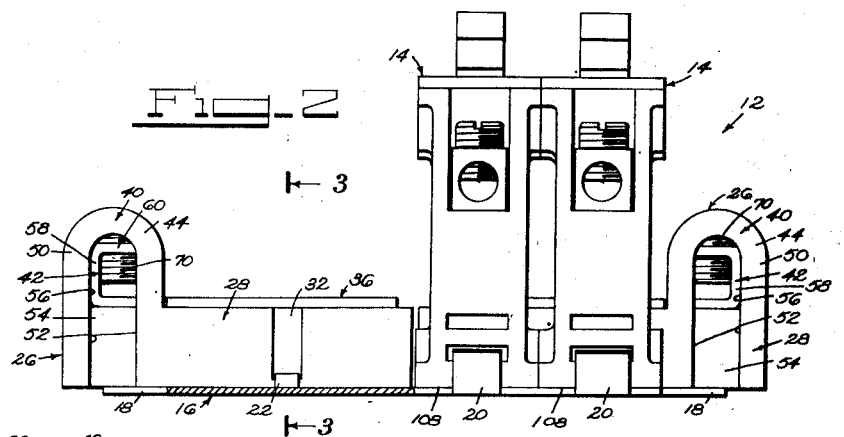
Fig. 2 is a sectional view taken on line 2—2 of Fig. 1.
Figure 3:
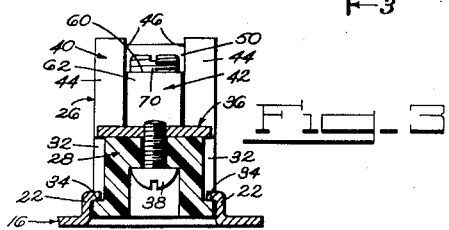
Fig. 3 is a sectional view taken on line 3—3 of Fig. 2.

Referring to the drawings in detail, and first to the form of the invention shown by Figs. 1 through 6 which illustrate the presently preferred embodiment of our invention, there is provided the terminal panel assembly 12 on which there may be removably mounted a plurality of suitable electrical devices 14, here shown as automatic circuit breakers as the panel assembly of the present invention was developed primarily for use with such devices.

The panel assembly 12 comprises a mounting plate or pan 16 which is preferably rigid and formed of a steel sheet of suitable shape. Said plate is provided with apertured ears 18, at the corners thereof, for securement within a box or other enclosure or to a suitable support (not shown). Said plate is provided with a plurality of hooked retaining elements or formations 20 (Figs. 1, 2 and 4) at the lateral marginal edges thereof, said elements being preferably integral with the body of the plate and having portions overlying the upper surface of the plate, there being one such element for each circuit breaker, as will presently appear. Substantially midway between its edges, plate 16 is provided with the companion confronting struck-up portions 22, 22 (Figs. 1–4), there preferably being one pair of said portions for each set of four retaining elements 20. Substantially midway between each pair of struck-up portions 22, 22, the plate is provided with the spaced slots 24, 24 (Figs. 4 and 5), each of said slots being laterally offset from one side of said struck-up portions, respectively.

As here shown, the plate 16 carries a pair of axially aligned terminal contact block units or connection members 26, 26, each having a molded insulating base 28 provided on its rear surface with the rearwardly projecting portions or nibs 30, 30, which fit into the companion slots 24, 24, to retain said block units against lateral dislodgment on said plate. A recessed portion on each side of said insulating base defines a vertical groove 32 which terminates at its lower end in the shoulder or step 34 which is engaged by a struck-up portion 22 for retaining the block unit 26 on said plate.

Each contact block unit 26 is provided with a conducting strap or bus bar 36 which is secured to the upper surface of base 28 in any suitable manner, as with the screw 38. It will be noted that the base 28 is provided with a portion 40 which forms a housing or support for the line terminal connector 42 of the strap 36. Said portion 40 comprises the spaced arms 44 which curve upwardly from base 28 and define a chamber 46 therebetween, said chamber being open at the front 48 thereof, and said arms curving downwardly and merging to form the rear wall 50 of said chamber. It will be noted that the arms 44 are grooved on their outer surfaces, as at 52, to narrow the portion 54 of base 28, said portion forming the floor of chamber 46, said chamber being open at both its sides, as at 56.

The line terminal connector 42 preferably is an integral portion of strap 36 and extends into chamber 46 through its open end 48 and abuts rear wall 50 thereof. Said connector is bent upwardly as at 58, reflexed as at 60, and then bent downwardly as at 62, a narrowed end portion 64 passing through a slot 66 in the strap and then being bent upwardly to abut the undersurface of the strap. Said end portion 64 is disposed in a recess or seat 68 formed in the upper surface of the narrowed portion 54 of base 28. A terminal screw 70 threadedly engages the reflexed or cross portion 60 and the confronting surfaces of portions 58 and 62. It will be apparent that a lead from one side of the power supply may be readily inserted through an opening 56 and disposed in the terminal connector 42, said lead being releasably retained therein by said terminal screw.

The insulating base 28 is provided with a pair of longitudinally spaced aligned recesses 72A, and a pair of longitudinally spaced aligned recesses 72B (Figs. 1, 4 and 5) spaced laterally of recesses 72A. Each recess 72A is in alignment with a recess 72B. Cooperating with each of said recesses is a contact means in the form of a rectangular slotted portion 74 defined in strap 36 and overlying the companion recess. The length and the width of said slotted portions are less than the length and the width, respectively, of the companion recesses, as illustrated in Figs. 4, 5 and 6, said slots thereby serving to narrow the entrance to said recesses. It will also be noted that the slots 74 are beveled at their opposing lateral edges 76A and 76B.

It will be apparent that the contact block units may be readily removed from the plate 16 by forcing back the struck-up portions 22 with any suitable tool. In this manner said units may be readily inspected, repaired or replaced.

The circuit breakers 14 may be of any desired construction, for example, and not by way of limitation, the circuit breaker may be of the type illustrated and described in Patent No. 2,459,427 to H. A. Humpage, dated January 18, 1949, now Re. 23,188, dated January 10, 1950, or in the copending application of Thomas M. Cole, Ser. No. 127,433, filed November 15, 1949, both of which are assigned to the assignee hereof. The circuit breaker casing 78 is provided at one end with an outer recess or formation 80 adapted to engage the hooked element 20 of plate 16. The other end of the casing is provided with a re-entrant lower portion 82 adapted to encompass the side and a portion of the top surface of a contact block unit 26, as illustrated in Fig. 4. The casing is provided, above said re-entrant portion 82, with a chamber 84. A plug-in terminal prong or stab contact 86 is mounted vertically in said chamber, said stab contact being provided with the laterally extending portions or arms 88 which are removably positioned in the cooperating recesses 90 formed in the walls of said chamber. A flexible connector 92A secured to the upper end of said stab contact connects the latter to the current responsive part of the circuit breaker, as shown for example in the above mentioned application of Thomas M. Cole.

Said stab contact 86 is preferably made in one piece of bronze and is provided with the axially extending prongs or stab elements 92, 94 and 96, it being noted from Fig. 4 that the outer prongs 92 and 96 lie within the same plane and that the intermediate prong 94 extends forwardly of said outer prongs from the bend 98 therein to lie within a plane offset laterally of said first mentioned plane. It will also be noted that the intermediate prong is tapered at its free end portion 100 and that the outer prongs are tapered at their free end portions 102. Each of said outer prongs is notched or recessed in the outer edge thereof, as at 104, and said edge is tapered as at 106 below the notch.

To mount a circuit breaker on the panel assembly 10, the circuit breaker is tilted so that a hook element 20 will engage in the casing recess 80, it being understood that the stab contact will be disposed above a contact slot 74, the stab contact then being urged downwardly will automatically enter a slot 74 and the bottom wall 108 of the casing will be disposed on the upper surface of plate 16, as illustrated in Fig. 4. The beveled edges 76A and 76B of the contact slot and the cooperating tapered portions 100 and 102 of the prongs will facilitate the entry of the contact stab into the slot, the prongs 92 and 96 flexing and the notched portions 104 thereof snapping into frictional engagement with the unbeveled peripheral edge portions 110A and 110B, respectively, of the contact slot (Fig. 6). The penetration of the free end of the contact stab into the recess 72A or 72B underlying the slot contact is limited by a shoulder 112 (Fig. 6) formed on each of said outer prongs at the upper end of the notch therein. During said entry of the stab contact into the slot contact, the rear surfaces of the outer prongs 92 and 96 frictionally engage the outer beveled edge 76A and the front surface of the intermediate prong 94 frictionally engages the inner beveled edge 76B, as illustrated in Fig. 4. It will be understood that the thickness of the stab contact is somewhat greater than the width of the slot contact so that the intermediate prong will flex rearwardly toward the outer prongs whereby the prongs will apply a resiliently firm contact pressure against the beveled slot edges to maintain good electrical contact and to prevent lateral movement of the stab contact, the vertical movement thereof being prevented by the aforesaid notch engagement. It will be noted that the stab contact makes electrical contact with all four edges of the slot contact, the notches engaging both of the unbeveled slot edges, the intermediate prong engaging one beveled slot edge and the outer prongs engaging the other beveled slot edge.

The circuit breaker 14 may be readily removed from the panel, when desired, by disengaging its stab contact from the companion panel contact 74 and then disengaging the recessed part 80 from the companion retaining element 20 of the panel. In this connection, it will be observed that the stab contact may be readily disengaged from the panel contact by grasping the circuit breaker casing at the stab contact end thereof and then tilting the circuit breaker upwardly until said contacts are clear of the panel contact. To facilitate said disengagement, the lower edge 114 of the notch 104 is downwardly inclined.

As illustrated and described herein, the terminal panel assembly 10 is provided with two contact block units 26 in end to end relation, each having provision to engage four circuit breakers. However, it will be understood that the assembly may be modified to contain a lesser or a greater number of circuit breakers.

Figure 9:
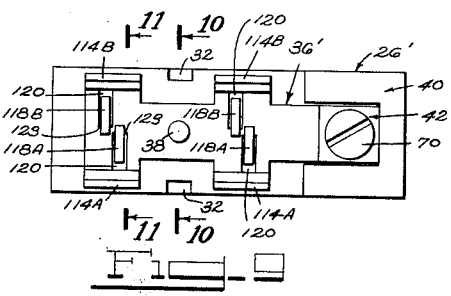
Fig. 9 is a top plan view of a terminal connecting block in the form of the invention illustrated in Fig 7.
Figure 10:
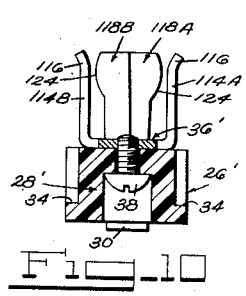
Fig. 10 is a sectional view taken on line 10—10 of Fig. 9.

Another form of the invention is illustrated in Figs. 7 through 11. As shown therein, the contact unit 26' is provided with the insulated base 28', which is similar in all respects to the insulated base 28 except that the companion chambers 72A and 72B of the latter are replaced by a unitary chamber 72, all other portions of base 28' being the same and bearing the same reference numerals as the similar parts of base 28. Contact unit 26' is also provided with the conducting strap or bus bar 36' which has the same line terminal connector 42 as on bus bar 36. In this form of the invention, the bus bar 36' is provided with the integral upstanding arms 114A and 114B constituting stationary contact members arranged in spaced pairs longitudinally of said bus bar, as illustrated in Fig. 9, each of said contact members being curved outwardly at the free end thereof, as at 116.

Figure 11:
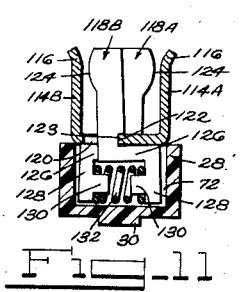
Fig. 11 is a sectional view taken on line 11—11 of Fig. 9.

Cooperating with each pair of said stationary contact members is a pair of movable contact members 118A and 118B, respectively, movable member 118A cooperating with stationary member 114A, and movable member 118B cooperating with stationary member 114B, as will hereinafter appear. Each movable contact member is disposed in a slotted portion 120 of conducting strap 36', said slotted portion extending transversely of the strap from the companion stationary contact member. Each movable contact member is provided with a recessed portion 122 having a fulcrum bearing engagement with the end 123 of slot 120 remote from the stationary contact member for pivotal movement of said movable contact member. Each movable contact member is provided with an arcuate contact-making part 124 facing its companion stationary contact member, and with a portion 126 extending transversely under strap 36'. Said portion 126 is provided with a depending portion 128, the latter being provided with a lateral nib 130. As illustrated in Fig. 11, the portions of each movable contact member below the contact strap 36' are disposed in chamber 72 in base 28', the nibs 130 thereof being in confronting relation. A helical compression spring 132 is carried by the nibs of each pair of movable contacts, 118A and 118B, respectively. Said spring normally biases the portions 128 of each pair of movable contacts outwardly in an opposite direction whereby the transverse portions 126 thereof are urged into abutment with the undersurface of strap 36', as illustrated in Fig. 11, and each movable contact is pivoted on the remote end 123 of slot 120, so that the arcuate portion 124 of contact 118A is moved toward contact member 114A, and the arcuate portion of contact member 118B is moved toward contact member 114B.

The circuit breaker 14' may be the same as breaker 14 except in respect to the stab contact thereof. The stab contact 133 of breaker 14' is provided with the lateral arms 134 which extend into casing recesses 90. Said stab contact is provided with a single prong 136 extending downwardly from said arms. Said prong is provided on its front face with a grooved portion 138, and, at its free end 140, is beveled inwardly at both its front and rear surfaces and at its marginal edges.

Figure 7:
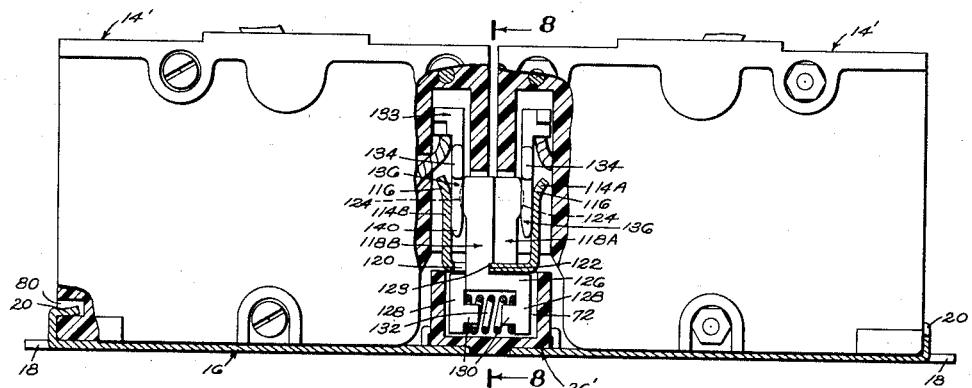
Fig. 7 is a view similar to Fig. 4, illustrating another form of the invention.
Figure 8:
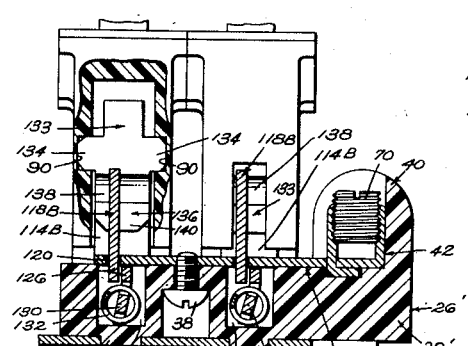
Fig. 8 is a sectional view taken on line 8—8 of Fig. 7, a portion of one circuit breaker being broken away.

The circuit breaker 14' is mounted on the terminal panel assembly in the same manner as the circuit breaker 14, the stab contact 132 being inserted between a stationary contact member 114A or 114B, and its companion movable contact member 118A or 118B, respectively, as illustrated in Fig. 7, it being understood that the beveled end 140 thereof cooperates with the curved end 116 of the stationary contact member to facilitate said insertion thereof. It will be understood that the stab contact 133 urges the arcuate portion 124 of the movable contact laterally away from its cooperating stationary contact member in opposition to the bias of spring 132, thereby causing said movable contact to pivot at the free end 123 of the slot 120 whereby the transverse portion 126 moves out of abutment against the undersurface of strap 36', to the position illustrated in Fig. 7, thereby causing part 128 to compress spring 130. At the point of maximum penetration, the arcuate portion 124 frictionally engages the grooved portion 138 of the stab contact, the latter being held in good mechanical engagement and electrical contact with both the movable and stationary contact members as a result of the pressure exerted on the movable contact member by the compressed spring.

While we have shown and described the presently preferred embodiments of our invention, it will be understood that various changes in the details of construction and in the form and arrangement of parts may be made without departing from the underlying idea or principles of this invention within the scope of the appended claims.

Having thus described our invention, what we desire to secure by Letters Patents, is:

1. A panel construction for the mounting thereon of a plurality of separate electrical devices each of which has at least one electrical terminal contact member adapted to releasably engage a companion contact on the panel, said panel being provided with a plurality of discrete retaining elements adapted to releasably engage said devices, respectively, and with a plurality of individual electric contacts adapted to releasably engage the terminal contact members, respectively, of the electrical devices mounted thereon, said panel contacts and retaining elements being arranged in pairs and the retaining element and panel contact of each pair being in spaced relation on the panel to receive a companion one of the electrical devices therebetween in releasable engagement therewith, the panel contact and retaining element of each pair being electrically independent of each other but adapted to act conjointly in releasably holding the companion electrical device in position on the panel and with the panel contact in electrical engagement with the terminal member of the companion device.

2. A terminal panel assembly adapted for use with an electrical device having a frictionally engageable terminal member, said assembly comprising a panel for bodily mounting said device thereon, a mechanical retaining element on said panel releasably engageable with said device, said element being integral with said panel, and a conducting member carried by said panel, said conducting member being provided with a slotted contact portion in predetermined disposition relative to said retaining element, said terminal member being removably insertable into and releasably engageable with said slotted portion for effecting a firm electrical engagement between said terminal member and said conducting member automatically upon the mounting of said device in position on said panel, said conducting member being provided with an insulated base mounted on a surface of said panel, said base having a recessed portion thereof underlying said slotted portion and spaced from said surface, said terminal member extending into said recessed portion when engaged in said slotted portion.

3. A terminal panel assembly adapted for use with a plurality of electrical devices each having a stab terminal, said assembly comprising a mounting plate for bodily mounting said devices in side-by-side disposition thereon and a terminal connection unit carried by said plate, said unit having an insulated base removably secured to said plate, said base being provided with a plurality of axially aligned surface recesses in predetermined disposition relative to said plate, and a conducting strap secured to said surface, said strap having a plurality of rectangularly slotted contact portions each of which overlies a companion one of said recesses, each of said contact portions being adapted to engage a stab terminal for making electrical contact with one of said devices upon the mounting of the latter in position on said mounting plate, said stab terminal extending into the companion recess when so engaged.

4. A terminal panel assembly adapted for use with an electrical device having a stab terminal provided with a notched portion and with a flexible portion spaced therefrom, said panel assembly comprising a plate adapted to bodily mount said device thereon, a mechanical retaining element on said panel releasably engageable with said device, said element being integral with said panel, and a conducting member mounted on said plate and provided with a slotted contact portion spaced from said retaining element and into which said terminal is removably insertable, the perimeter of said slotted portion engaging in said notched portion to releasably lock said terminal against displacement from said conducting member and flexing said flexible portion whereby the latter applies a resilient pressure against said slotted portion to effect a firm electrical engagement between said terminal and said conducting member.

5. A terminal panel assembly adapted for use with an electrical device having a stab terminal member, said assembly having means for bodily mounting said device thereon and a terminal block unit carried by said mounting means, said unit comprising an insulated base secured to said mounting means and provided with a recess therein, and a conducting member carried by said base, said conducting member having a pair of relatively movable contact members, one of said contact members having a portion confronting the other contact member and a portion extending into said recess, means in said recess engaging said extending portion for biasing said confronting portion toward the other contact member, said other contact member being integral with said conducting member, said terminal member being engageable between said confronting portion and said other contact member in opposition to the bias applied to said one contact member.

6. A terminal panel assembly adapted for use with an electrical device having a frictionally engageable terminal member, said assembly having means for bodily mounting said device thereon and a terminal block unit carried by said mounting means, said unit comprising an insulated base secured to said mounting means and provided with a recess therein, and a conducting member carried by said base, said conducting member having a stationary contact member at each of the marginal side edges thereof and a movable contact member companion to each of said stationary contact members, respectively, said movable member being mounted for pivotal movement relative to said conducting member and having a portion confronting the companion stationary contact member and a portion extending into said recess, spring means engaged between said extending portions of said movable contact members for biasing said confronting portions thereof toward the companion stationary contact members, said terminal member being frictionally engageable between a stationary contact member and the confronting portion of the companion movable contact member in opposition to the bias applied to the latter.

7. In combination, a terminal panel assembly and an electrical circuit-controlling device having a stab terminal member for effecting electrical contact with said panel assembly, said panel assembly comprising a mounting plate having a part releasably engageable with said device for bodily mounting said device in position thereon, a conducting member carried by said plate and provided with a rectangularly slotted contact portion, said stab terminal having a pair of laterally spaced prongs and an intermediate flexible prong offset laterally from said pair of prongs, said pair of prongs being notched in their outer edges, said stab terminal being removably insertable in said slotted portion in said position of said device, said notches engaging opposing sides of said slotted portion, said spaced prongs engaging another side of said slotted portion, and said intermediate prong flexing against the side of said slotted portion opposite said other side and applying a resilient pressure thereto for effecting a firm engagement between said stab terminal and said conducting member.

8. In combination, a terminal panel assembly and an electrical circuit-controlling device having a stab terminal member for effecting electrical contact with said panel assembly, said panel assembly comprising a mounting plate for bodily mounting said device in position thereon, and a terminal block unit carried by said mounting means, said unit comprising an insulated base secured to said mounting plate and provided with a recess therein and a conducting member carried by said base, said conducting member having a stationary contact member and a companion movable contact member fulcrumed thereon and having a portion confronting said conducting member and a portion extending into said recess, means in said recess engaging said extending portion for biasing said confronting portion toward said stationary contact member, said terminal member being engageable in said position between said stationary contact member and confronting portion in opposition to the bias applied to the latter.

9. In combination, a terminal panel assembly and an electrical circuit-controlling device having a stab terminal member for effecting electrical contact with said panel assembly, said panel assembly comprising a mounting plate for bodily mounting said device thereon, and a terminal block unit carried by said mounting means, said unit comprising an insulated base secured to said mounting means and provided with a recess therein and a conducting member carried by said base, said conducting member having a stationary contact member extending therefrom and a companion movable contact member pivotally mounted in said conducting member and having a portion extending above said conducting member and a portion extending below said conducting member into said recess, means disposed in said recess and engaging said lower portion for biasing said upper portion toward said stationary contact member, said terminal member being engageable between said stationary and movable contact members in opposition to the bias applied to the latter, said stab terminal having a grooved portion on one face thereof and said portion of said movable contact member extending above said conducting member having an arcuate portion engageable in said grooved portion.

10. A circuit breaker adapted for mounting on a terminal panel assembly having a rectangularly slotted contact portion, said circuit breaker being provided with a stab terminal member having a pair of laterally spaced prongs and an intermediate flexible prong offset laterally from said pair of prongs and substantially parallel therewith, said pair of prongs being notched in their outer edges, said stab terminal being removably insertable in said slotted portion, said notches engaging opposing sides of said slotted portion, said spaced prongs engaging another side of said slotted portion and said intermediate prong being flexed toward said pair of prongs upon engagement with the side of said slotted portion opposite said other side to apply a resilient pressure against said slotted portion for maintaining firm electrical contact therewith.

11. In combination, a terminal panel assembly and an electrical circuit-controlling device having a stab terminal member for effecting electrical contact with said panel assembly, said panel assembly comprising a mounting plate provided with a fixed part releasably engageable with said device for bodily mounting said device in predetermined position thereon, a conducting member carried by said plate and provided with a slotted contact portion, said stab terminal entering said slotted portion when said device is mounted in said position on said panel assembly, said stab terminal having a notched part and a flexible part spaced therefrom, one side of said slotted portion engaging in said notched part to releasably lock said stab terminal and said flexible part engaging another side thereof and being flexed by said engagement to apply a resilient pressure against said slotted portion for effecting a firm engagement therewith.

12. A circuit breaker adapted for mounting on a terminal panel assembly having a rectangularly slotted contact portion, said circuit breaker being provided with a stab terminal member for releasable engagement in said slotted portion, said terminal member having a first stab element engageable with one side of said slotted portion, said stab element being notched for engagement with an adjacent side of said slotted portion, and an additional stab element disposed laterally outwardly of said first stab element and substantially parallel thereto, said additional element being flexed toward said first stab element upon engagement with the side of said slotted portion confronting said one side thereof to apply a resilient pressure against said slotted portion for maintaining firm electrical contact therewith.

13. A distribution panel board, comprising an electric panel, and a plurality of automatic circuit breakers releasably mounted thereon, said panel having plug-in electric terminal securing means carried thereby and circuit breaker holding means disposed laterally of and spaced from said plug-in electric terminal securing means so that a plurality of circuit breakers may be mounted in side-by-side relation on said panel in endwise positions between said holding means and said plug-in electric terminal securing means, each of said circuit breakers having a casing provided with complementary holding means and complementary plug-in electric terminal securing means spaced rearwardly of the front of the casing and from each other endwise of the circuit breaker and disposed forwardly of the back of the casing for releasable engagement with the panel holding means and the panel plug-in terminal securing means, respectively, said panel holding means being insulated from the circuit which includes the panel plug-in terminal securing means, said panel holding means and said plug-in terminal securing means acting conjointly to releasably secure the circuit breakers on said panel.

14. A distribution panel board, comprising an electric panel, and a plurality of automatic circuit breakers releasably mounted thereon, said panel having plug-in electric terminal securing means carried thereby and circuit breaker holding means disposed laterally of and spaced from said plug-in electric terminal securing means so that a plurality of circuit breakers may be mounted in side-by-side relation on said panel in endwise positions between said holding means and said plug-in electric terminal securing means, each of said circuit breakers having a casing provided with complementary holding means and complementary plug-in electric terminal securing means spaced rearwardly of the front of the casing and from each other endwise of the circuit breaker and disposed forwardly of the back of the casing for releasable engagement with the panel holding means and the panel plug-in terminal securing means, respectively, said panel holding means being insulated from the circuit which includes the panel plug-in terminal securing means, said panel holding means and said plug-in terminal securing means acting conjointly to releasably secure the circuit breakers on said panel, each circuit breaker being mountable in position on said panel by first engaging its complementary holding means with the panel holding means and then pivotally moving the circuit breaker on said panel with said panel holding means as a fulcrum to engage the plug-in electrical terminal securing means of the circuit breaker with the plug-in electric terminal securing means of the panel.

15. A distribution panel board, comprising an electric panel, and a plurality of automatic circuit breakers releasably mounted thereon, said panel having plug-in electric terminal securing means carried thereby and circuit breaker holding means disposed laterally of and spaced from said plug-in electric terminal securing means so that a plurality of circuit breakers may be mounted in side-by-side relation on said panel in endwise positions between said holding means and said plug-in electric terminal securing means, each of said circuit breakers having a casing provided with complementary holding means and complementary plug-in electric terminal securing means spaced rearwardly of the front of the casing and from each other endwise of the circuit breaker and disposed forwardly of the back of the casing for releasable engagement with the panel holding means and the panel plug-in terminal securing means, respectively, said panel holding means being insulated from the circuit which includes the panel plug-in terminal securing means, said panel holding means and said plug-in terminal securing means acting conjointly to releasably secure the circuit breakers on said panel, the panel holding means comprising a plurality of hook-like elements and the complementary holding means on the circuit breakers comprising recessed portions in which said hook-like elements are engaged, each circuit breaker being mountable in position on said panel by first engaging its complementary holding means with the panel holding means and then pivotally moving the circuit breaker on said panel with said panel holding means as a fulcrum to engage the plug-in electrical terminal securing means of the circuit breaker with the plug-in electric terminal securing means of the panel.

16. A distribution panel board, comprising an electric panel, and a plurality of automatic circuit breakers releasably mounted thereon, said panel having plug-in electric terminal securing means carried thereby and circuit breaker holding means disposed laterally of and spaced from said plug-in electric terminal securing means so that a plurality of circuit breakers may be mounted in side-by-side relation on said panel in endwise positions between said holding means and said plug-in electric terminal securing means, each of said circuit breakers having a casing provided with complementary holding means and complementary plug-in electric terminal securing means spaced from each other endwise of the circuit breaker casing, said panel holding means and said circuit breaker holding means having releasable mutually interengaging portions to position the adjacent end of the circuit breaker casing on the panel and prevent lateral movement of said adjacent end on the panel and said plug-in terminal securing means of the panel for a companion circuit breaker being disposed in lateral alignment with the holding means of the panel for such companion breaker so that when it is engaged by the plug-in terminal securing means of the circuit breaker the opposite end of the latter is positioned on the panel and releasably held against lateral movement thereon whereby to releasably hold the plurality of breakers in parallel side-by-side relation, said holding means and plug-in electrical terminal securing means of the panel also having parts which engage the companion breakers to releasably oppose removal thereof from the panel.

17. A distribution panel board, comprising an electrical panel, and a plurality of automatic circuit breakers releasably mounted thereon, said panel having plug-in electric terminal securing means carried thereby and circuit breaker holding means disposed laterally of and spaced from said plug-in electric terminal securing means so that a plurality of circuit breakers may be mounted in side-by-side relation on said panel in endwise positions between said holding means and said plug-in electric terminal securing means, each of said circuit breakers having a casing provided with complementary holding means and complementary plug-in electric terminal securing means spaced from each other endwise of the circuit breaker casing, said panel holding means and said circuit breaker holding means having releasable mutually interengaging portions to position the adjacent end of the circuit breaker casing on the panel and prevent lateral movement of said adjacent end on the panel, and said plug-in terminal securing means of the panel for a companion circuit breaker being disposed in lateral alignment with the holding means of the panel for such companion breaker so that when it is engaged by the plug-in terminal securing means of the circuit breaker the opposite end of the latter is positioned on the panel and releasably held against lateral movement thereon whereby to releasably hold the plurality of breakers in parallel side-by-side relation, said holding means and plug-in electrical terminal securing means of the panel also having parts which engage the companion breakers to releasably oppose removal thereof from the panel, each circuit breaker being mountable in position on said panel by first engaging its complementary holding means with the panel holding means and then pivotally moving the circuit breaker on said panel with said panel holding means as a fulcrum to engage the plug-in electrical terminal securing means of the circuit breaker with the plug-in electric terminal securing means of the panel.

18. A distribution panel board, comprising an electrical panel, and a plurality of automatic circuit breakers releasably mounted thereon, said panel having plug-in electric terminal securing means carried thereby and circuit breaker holding means disposed laterally of and spaced from said plug-in electric terminal securing means so that a plurality of circuit breakers may be mounted in side-by-side relation on said panel in endwise positions between said holding means and said plug-in electric terminal securing means, each of said circuit breakers having a casing provided with complementary holding means and complementary plug-in electric terminal securing means spaced from each other endwise of the circuit breaker casing, said panel holding means and said circuit breaker holding means having releasable mutually interengaging portions to position the adjacent end of the circuit breaker casing on the panel and prevent lateral movement of said adjacent end on the panel and said plug-in terminal securing means of the panel for a companion circuit breaker being disposed in lateral alignment with the holding means of the panel for such companion breaker so that when it is engaged by the plug-in terminal securing means of the circuit breaker the opposite end of the latter is positioned on the panel and releasably held against lateral movement thereon whereby to releasably hold the plurality of breakers in parallel side-by-side relation, said holding means and plug-in electrical terminal securing means of the panel also having parts which engage the companion breakers to releasably oppose removal thereof from the panel, the panel holding means comprising a plurality of hook-like elements and the complementary holding means on the circuit breakers comprising recessed portions in which said hook-like elements are engaged, each circuit breaker being mountable in position on said panel by first engaging its complementary holding means with the panel holding means and then pivotally moving the circuit breaker on said panel with said panel holding means as a fulcrum to engage the plug-in electrical terminal securing means of the circuit breaker with the plug-in electric terminal securing means of the panel.

19. A panel construction as defined by claim 1, comprising a bus bar provided with apertured portions spaced longitudinally of the bus bar, said apertured portions constituting said individual electric contacts.

20. A panel construction as defined by claim 1, comprising a bus bar provided with companion projecting portions which are transverse to the panel and constitute said individual electric contacts and are resiliently engageable by the terminal contacts of said electrical devices, respectively.

21. A distribution panel board, comprising an electric panel, and a plurality of automatic circuit breakers releasably mounted thereon, said panel having plug-in electric terminal securing means carried thereby and circuit breaker holding means disposed laterally of and spaced from said plug-in electric terminal securing means so that a plurality of circuit breakers may be mounted in side-by-side relation on said panel in endwise positions between said holding means and said plug-in electric terminal securing means, each of said circuit breakers having a casing provided with complementary holding means and complementary plug-in electric terminal securing means spaced from each other endwise of the circuit breaker casing, said panel holding means and said circuit breaker holding means having releasable mutually interengaging portions to position the adjacent end of the circuit breaker casing on the panel and prevent lateral movement of said adjacent end on the panel and said plug-in terminal securing means of the panel for a companion circuit breaker being disposed in lateral alignment with the holding means of the panel for such companion breaker so that when it is engaged by the plug-in terminal securing means of the circuit breaker the opposite end of the latter is positioned on the panel and releasably held against lateral movement thereon whereby to releasably hold the plurality of breakers in parallel side-by-side relation, said plug-in terminal securing means of the panel being supported in operative plug-in position independently of the presence of any circuit breaker on the panel.

22. A distribution plug-in electrical panel for mounting thereon a plurality of individual casing-enclosed automatic circuit breakers wherein the casing of the circuit breaker has opposite ends provided, respectively, with electrical terminal securing means and mechanical holding means, said panel having plug-in electric terminal securing means carried thereby and circuit breaker holding means disposed laterally of and spaced from said plug-in electric terminal securing means so that a plurality of circuit breakers may be mounted in side-by-side relation on said panel in endwise positions between said holding means and said plug-in electric terminal securing means, said plug-in terminal securing means of the panel being supported in operative plug-in position independently of the presence of any circuit breaker on the panel, said panel holding means being insulated from the circuit which includes said panel plug-in electric terminal securing means and arranged to overlie the holding means of the circuit breakers whereby to prevent disengagement of the circuit breaker from the panel without disengaging the circuit breaker electric plug-in terminal securing means from the plug-in electric terminal securing means of the panel.

23. A distribution plug-in electrical panel for mounting thereon a plurality of individual casing-enclosed automatic circuit breakers wherein the casing of the circuit breaker has opposite ends provided, respectively, with electrical terminal securing means and mechanical holding means, said panel having plug-in electric terminal securing means carried thereby and circuit breaker holding means disposed laterally of and spaced from said plug-in electric terminal securing means so that a plurality of circuit breakers may be mounted in side-by-side relation on said panel in endwise positions between said holding means and said plug-in electric terminal securing means, said plug-in terminal securing means of the panel being supported in operative plug-in position independently of the presence of any circuit breaker on the panel, said panel holding means being insulated from the circuit which includes said panel plug-in electric terminal securing means, said panel holding means and said plug-in electric terminal securing means of the panel being electrically insulated from each other, and one of said last mentioned means overlapping the casing of the plugged-in circuit breakers so as to prevent simultaneous disengagement of the holding means and the electric terminal securing means of a circuit breaker from the panel.

24. A distribution panel board, comprising an electric panel, and a plurality of circuit breakers releasably mounted thereon, said panel having plug-in electric terminal securing means carried thereby, said panel also comprising circuit-breaker holding means disposed laterally of and spaced from said plug-in electric terminal securing means so that a plurality of circuit breakers may be mounted in side-by-side relation on said panel in endwise positions between said holding means and said terminal securing means, each of said circuit breakers comprising a casing having opposite end walls and a back wall, each circuit breaker having complementary holding means adjacent one of said end walls releasably engaged by said holding means of the panel, said plug-in terminal securing means of the breaker being connected to the interior of the casing adjacent said end wall at a point above said back wall, and a plug-in electrical terminal securing means carried by each of said circuit breakers at its opposite end wall in releasable plug-in engagement with said plug-in terminal securing means of said panel, said plug-in terminal securing means of the panel being supported in operative plug-in position independently of the presence of any circuit breaker on the panel, said holding means and said plug-in terminal securing means of the panel acting conjointly with said complementary means of the circuit breaker casings and said plug-in terminals at the opposite ends of said circuit breakers, respectively, to releasably secure said circuit breakers in said side-by-side relation on said part of the panel means.

25. A plug-in circuit breaker for an electrical panel board, comprising a casing having opposite side walls, opposite end walls, and a back wall, and electrical terminal members disposed at said opposite end walls, respectively, said end walls having openings forwardly of said back wall for connection of said terminal members, respectively, in the interior of the casing, one of said terminal members being a plug-in electrical terminal securing means mounted on said casing in position adjacent said one of the end walls thereof, said side walls having parts adjacent said one end wall between which the plug-in terminal is positioned and which cover portions thereof, said casing having a recessed portion adjacent the opposite end wall for engagement with a complementary part of the panel of said panelboard to prevent lateral movement of the breaker on the panel.

26. A circuit breaker adapted for mounting on a terminal panel having a formation for holding the circuit breaker and an electric terminal, said circuit breaker having a casing provided with an externally accessible holding formation for engagement by said first mentioned formation and an electric terminal complementary to said first mentioned electric terminal, said circuit breaker electric terminal being adapted to releasably interlock with said panel electric terminal, whereby said circuit breaker formation and electric terminal cooperate with the panel formation and electric terminal to releasably lock said circuit breaker in position on said panel, said electric terminal projecting externally of the casing and provided with an open recess into which the panel terminal locks to provide a mechanical interlock between the terminals, and the circuit breaker terminal having a portion resiliently displaceable by the panel terminal to releasably secure said mechanical interlock.

THOMAS M. COLE.
PAUL M. CHRISTENSEN.

References Cited in the file of this patent

UNITED STATES PATENTS

| Number | Name | Date |
| --- | --- | --- |
| 1,938,309 | Williams | Dec. 5, 1933 |
| 2,081,100 | Blakeslee | May 18, 1937 |
| 2,092,631 | Bakke | Sept. 7, 1937 |
| 2,201,679 | Harvey | May 21, 1940 |
| 2,235,535 | Saunders | Mar. 18, 1941 |
| 2,281,221 | Anderson | Apr. 28, 1942 |
| 2,291,674 | Alden | Aug. 4, 1942 |
| 2,372,083 | Johansson | Mar. 20, 1945 |
| 2,440,824 | Jackson | May 4, 1948 |
| 2,452,019 | Rowe | Oct. 19, 1948 |
| 2,526,201 | Daly | Oct. 17, 1950 |
| 2,530,548 | Stanley | Nov. 21, 1950 |

FOREIGN PATENTS

| Number | Country | Date |
| --- | --- | --- |
| 24,697 | Great Britain | June 26, 1915 |
| 701,151 | Germany | Jan. 9, 1941 |